(12) United States Patent
Simpson, Sr.

(10) Patent No.: US 8,076,397 B2
(45) Date of Patent: Dec. 13, 2011

(54) PRINTING INK BASE MATERIAL

(75) Inventor: Daniel Thomas Simpson, Sr., University City, MO (US)

(73) Assignee: Graphix Essentials, LLC

( * ) Notice: Subject to any disclaimer, the term of this patent is extended or adjusted under 35 U.S.C. 154(b) by 577 days.

(21) Appl. No.: 11/904,870

(22) Filed: Sep. 28, 2007

(65) Prior Publication Data
US 2009/0088498 A1    Apr. 2, 2009

(51) Int. Cl.
*A61L 17/12*    (2006.01)
*C08L 5/02*    (2006.01)
(52) U.S. Cl. .......................................... 524/54
(58) Field of Classification Search ....................... 524/54
See application file for complete search history.

(56) References Cited

U.S. PATENT DOCUMENTS

| | | |
|---|---|---|
| 2,936,241 A | 5/1960 | Sharp et al. |
| 3,945,957 A | 3/1976 | Noshiro et al. |
| 3,948,827 A | 4/1976 | Noshiro et al. |
| 4,061,610 A | 12/1977 | Glowaky et al. |
| 4,061,611 A | 12/1977 | Glowaky et al. |
| 4,115,056 A | 9/1978 | Koller et al. |
| 4,115,329 A | 9/1978 | Noshiro et al. |
| 4,262,936 A | 4/1981 | Miyamoto |
| 4,304,601 A | 12/1981 | Sharp |
| 4,310,356 A | 1/1982 | Trubiano et al. |
| 4,508,570 A | 4/1985 | Fujii et al. |
| 4,601,974 A | 7/1986 | Kita et al. |
| 4,648,905 A | 3/1987 | Peck et al. |
| 4,802,924 A | 2/1989 | Woznicki et al. |
| 4,828,841 A | 5/1989 | Porter et al. |
| 4,904,303 A | 2/1990 | Rudolphy et al. |
| 5,302,195 A | 4/1994 | Helbrecht et al. |
| 5,486,549 A | 1/1996 | Itagaki et al. |
| 5,567,747 A | 10/1996 | Cappuccio et al. |
| 5,854,320 A | 12/1998 | Nakamura et al. |
| 6,043,297 A | 3/2000 | Sano |
| 6,105,502 A | 8/2000 | Wagner et al. |
| 6,420,091 B1 | 7/2002 | Nakayama et al. |
| 6,423,775 B1 | 7/2002 | Brune et al. |
| 6,440,535 B1 | 8/2002 | Iu et al. |
| 6,579,555 B1 | 6/2003 | Weinstein et al. |
| 2003/0144375 A1* | 7/2003 | Wu et al. ........................ 523/160 |
| 2003/0177947 A1* | 9/2003 | Ikoma ......................... 106/31.78 |
| 2004/0121675 A1 | 6/2004 | Snowden et al. |
| 2005/0019508 A1* | 1/2005 | Engel et al. ................. 428/32.38 |
| 2005/0096410 A1* | 5/2005 | Hattori et al. .................. 523/161 |
| 2006/0257441 A1 | 11/2006 | Komai et al. |
| 2007/0088099 A1 | 4/2007 | Mentink et al. |
| 2007/0197685 A1 | 8/2007 | Aruga et al. |

FOREIGN PATENT DOCUMENTS

| | | |
|---|---|---|
| EP | 0911361 | 4/2004 |
| EP | 1529820 | 5/2005 |
| WO | WO 2006060784 A2 * | 6/2006 |

OTHER PUBLICATIONS

Printing Ink Handbook, Fifth Edition, National Association of Printing Ink Manufacturers, Inc. 1988.
Fibersol-2 A Versitile Fiber for Consumers and Formulators ADM Specialty Food Ingredients, Decatur, Illinois 2006.
Nutriose: Analytical Aspects Reference: Gordon and Okuma 2002 Roquette Freres S.A.—Jun. 2006.

* cited by examiner

*Primary Examiner* — Mark Eashoo
*Assistant Examiner* — Angela C Scott
(74) *Attorney, Agent, or Firm* — Simpson Law Firm, L.L.C.; Daniel T. Simpson, Jr.

(57) ABSTRACT

The invention is a water-based base material for printing inks, as well as a method for making the same, where the printing inks are primarily for use in flexographic or rotogravure printing, where the base material comprises blend vehicle and a dextrin. Additional components may be added, including but not limited to a drying retarder, a defoamer, a coalescing agent, a dispersant, water, one or more pigments or dyes, inert materials, and other materials known by those of ordinary skill in the art.

23 Claims, No Drawings

PRINTING INK BASE MATERIAL

CROSS REFERENCE TO RELATED APPLICATION

Not applicable.

STATEMENT REGARDING FEDERALLY SPONSORED RESEARCH OR DEVELOPMENT

Not applicable.

SEQUENCE LISTING, TABLE OR COMPUTER PROGRAM ON COMPACT DISC

Not applicable.

FIELD OF THE INVENTION

The invention is a water-based base material for printing inks, as well as a method for making the same, where the printing inks are primarily for use in flexographic or rotogravure printing, where the base material comprises blend vehicle and a dextrin. Additional components may be added, including but not limited to a drying retarder, a defoamer, a coalescing agent, a dispersant, water, one or more pigments or dyes, inert materials, and other materials known by those of ordinary skill in the art.

DISCUSSION OF THE PRIOR ART

Other patents have disclosed dextrin as a component of a printing ink, the disclosures of each of which are distinguishable from the present invention.

U.S. Pat. No. 2,936,241, to Sharp, et al., discloses anhydrous hydrophilic ink for use in offset printing that, in one embodiment, comprises dextrin as an anti-smudging additive.

U.S. Pat. No. 3,945,957, to Noshiro, et al., discloses a dry planographic printing ink composition, with a silicon-based resin as the ink base, and with dextrin as a potential vehicle for the ink composition among a long list of potential vehicles.

U.S. Pat. No. 3,948,827, to Noshiro, et al., discloses and claims a dry planographic printing ink composition with a silicon-based resin compound, and also discloses dextrin as a potential vehicle for the ink composition, among a long list of potential vehicles.

U.S. Pat. No. 4,115,392, to Noshiro, et al., discloses and claims a silicon-based resin compound, and discloses dextrin as a potential additive in the ink vehicle.

U.S. Pat. No. 4,304,601, to Sharp, discloses and claims a planographic printing ink that comprises a varnish and a silicone resin, and dextrin is disclosed as one of many potential pigment carriers for the printing ink vehicle.

U.S. Pat. No. 6,105,502, to Wagner, et al., discloses and claims a printing process, as well as acceptable ink for use therewith, where the ink includes isocyanate and epoxy-derived compounds, and discloses dextrin as one of many potential lithographic printing vehicles.

In the foregoing six U.S. patent references, the printing ink disclosed is distinguishable from the present invention. The foregoing six references' disclosures, among other distinguishing features, are not water-based printing inks. Lithographic printing, which is based on the premise of the repulsion of water and oil, is not a suitable printing process for the present invention. Each of the foregoing six references contains materials that are not found in the present invention.

Still even more patents have disclosed dextrin as a component of a printing ink, the disclosures of each of which are distinguishable from the present invention.

U.S. Pat. No. 4,115,056, to Koller, et al., discloses and claims methods of dyeing and printing, which include the use of anthraquinone-based dyes.

U.S. Pat. No. 4,508,570, to Fujii, et al., discloses ink for use in ink-jet printing, comprising polyoyxethylene compounds as part of the base.

U.S. Pat. No. 4,648,905, to Peck, et al., discloses an ink vehicle that comprises a sulfated fatty acid component as a binder, where the binder is more than half of the vehicle solids.

U.S. Pat. No. 4,802,924, to Woznicki, et al., discloses and claims a method of coating pharmaceutical tablets, food and confectionery items with a protective film coating, where the composition comprises a polydextrose base.

U.S. Pat. No. 4,828,841, to Porter, et al., discloses and claims a film modifier consisting essentially of powered particles of film-forming non-toxic edible malrodextrin to make an edible film coating.

U.S. Pat. No. 5,302,195, to Helbrecht, et al., discloses a printing ink suitable for thermal ink jet printing, where the ink includes a cyclodextrin. The reference invention uses the hydrophobic cavity of the cyclodextrin molecules to act as a container for oil soluble or alcohol soluble dye materials, which improves the water dispersability of the dye. The vehicle for the printing ink either consists of water or comprises water and a miscible organic component.

U.S. Pat. No. 5,486,549, to Itagaki, et al., discloses a low-foaming water-based printing ink composition, where a new specific silicone-based defoamer composition an essential element.

U.S. Pat. No. 5,567,747, to Cappuccio, et al., discloses and claims a water-based oxidizing printing ink comprising, among other things, an epoxy ester resin, and additionally comprises a cyclodextrin.

U.S. Pat. No. 5,854,320, to Nakamura, et al., discloses and claims a water base erasable ink composition for use in marking pens, where the printing ink comprises an aqueous emulsion of an oily material and additionally discloses a cyclodextrin as a component of the ink. The oily material in the printing ink allows the printed product to be erasable.

In the foregoing nine patent references, the printing ink disclosed is distinguishable from the present invention. The foregoing nine references' disclosures, among other distinguishing features, contain ink base materials or other essential elements that are distinct from and not necessarily a part of the base material of the present invention.

The present invention is thus distinguishable from the preceding references, as well as the prior art, for reasons more thoroughly enumerated herein.

BRIEF DESCRIPTION OF THE DRAWINGS

None.

SUMMARY OF THE INVENTION

The present invention is a printing ink base material that comprises a blend vehicle and a dextrin, as well as a method for manufacturing the same. The base material may contain additional components, as enumerated herein.

The present invention is a base material for printing inks that are generally not appropriate for lithographic printing. Lithography is based upon the principle that water and oil do not mix. Variations of lithography, such as planographic printing and offset printing, are similarly generally not appropriate printing methods for the present invention. The lithographic process inherently involves the use of an oil-based ink, whereas the present invention is water-based.

Dextrins are carbohydrates, made through the hydrolysis of starch. Structurally, dextrins are glucose polymer chains, and may be linear, branched, or cyclic. Carbohydrates are typically long chains, whereas dextrins are typically much shorter chains, or linked series of chains, of glucose. They are generally relatively inexpensive and non-reactive, and therefore widely used in a variety of industrial and food applications.

In a water-based emulsion, dextrin exhibits a wide range of compatibility with multiple types of non-volatile solids in the blend vehicle. This compatibility enables the development of multiple types of printing inks, which in turn can be formulated to accommodate variations in substrates printed, as well as in the mechanics of a flexographic or rotogravure printing process.

Dextrin increases total non-volatile solids in the base material of the present invention, which subsequently increases the viscosity of the base material while at the same time maintaining Newtonian rheology. A base material with an increased viscosity may be subsequently made into a printing ink that also has an increased viscosity. The increased viscosity in the subsequent printing ink allows for optimal press performance, in a flexographic or rotogravure printing process.

Dextrin decreases the resistance to transfer of a printing ink made from the base material of the present invention in a flexographic or rotogravure printing process, which translates to an improvement in printing ink flow during the printing process. This improvement in printing ink flow from engraved anilox and cylinder cells to the substrate being printed increases the total ink volume transferred. This advantage is maintained with the inclusion of inert materials, such as pigments, that may be present in the base material or the subsequent printing ink. Higher volume transfer of printing ink allows for the use of smaller volume engraved cells on higher line count aniloxes/cylinders which in turn enables the printing of higher definition and quality graphics.

Dextrin improves printing inks stability, assisting in the prevention of ink phase separation and re-agglomeration of some inert materials, such as pigments, that may be present in the base material or the subsequent printing ink. Dextrin aids in the dispersion and suspension of inert materials, such as pigments, including those with moderate to high surface areas, micron particle sizes and specific gravities.

In addition to a blend vehicle and a dextrin, the base material of the present invention may also have additional components, such as a drying retarder, a defoamer, a coalescing agent, a dispersant, and water. Ultimately, the present invention may have pigment added to it, and potentially additional materials, including inert materials, to create a printing ink.

DETAILED DESCRIPTION OF THE INVENTION

The present invention is a printing ink base material that comprises a blend vehicle and a dextrin, as well as a method for manufacturing the same.

Dietary fiber, generally, is an indigestible portion of plants or plant-derived foods that absorb water. Dietary fiber comprises non-starch polysaccharides and other plant components, including dextrin. Dietary fibers may be divided into soluble fiber and insoluble fiber. Soluble dietary fiber undergoes metabolic processing in the large intestine, through fermentation by colonic bacteria.

Dextrins are low molecular weight carbohydrates produced through the hydrolysis of starch, and are essentially polymers comprised of glucose molecules. Non-limiting examples of sources of starch that may be converted to dextrin that would be suitable for the present invention include potato, corn, rice, wheat, soy, barley, maize, arrowroot, tapioca and other grains, tubers and plants. Dextrin, unlike starch, is soluble in water. Typically, dextrins are commercially available as powders that vary in color from white to yellow to amber. Dextrins may be described as containing a certain percentage by weight of soluble dietary fiber.

It should be noted, and is understood by those of ordinary skill in the art, that the source of the dextrin that is a component of the present invention is not limited to dextrins produced through the hydrolysis of starch, although that is the most common method of manufacture. Dextrins suitable as components of the present invention may include those synthesized or otherwise created through processes, either natural or artificial, other than the hydrolysis of starch. Dextrins suitable for the present invention may also include dextrins that have been prepared by processes beyond initial hydrolysis, including but not limited to refining, purification and drying.

The term 'dextrin', as used herein, should also be interpreted to include cyclical dextrin, also known as cyclodextrin, which are ring structures of dextrin, typically between five and twelve glucose molecules around, although the spirit and scope of the invention embraces cyclodextrins of any amount of molecules around.

A preferred dextrin for use in the present invention is Nutriose® FB, manufactured by Roquette Frères, described as "a water soluble, free-flowing amorphous powder having very low hygroscopity." It is made "by dextrinization of wheat starch, followed by refining, purification and drying."

Nutriose® FB is defined generally by the structure:

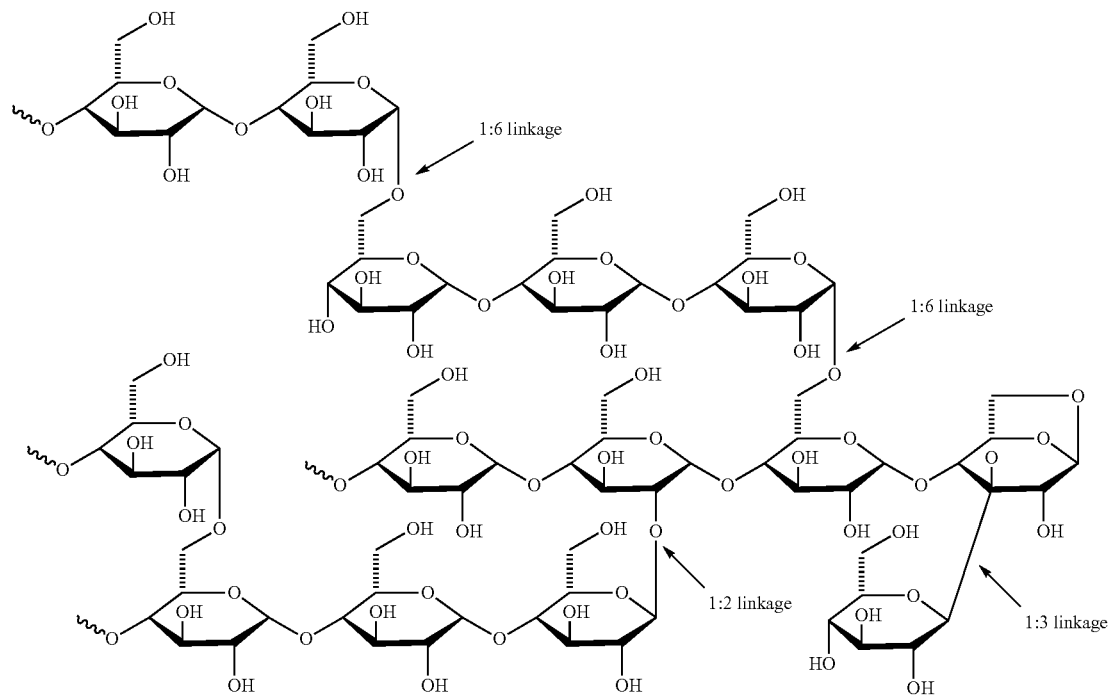

Although Nutriose® FB is currently a preferred dextrin, it is possible that, with additional testing, another alternative or perhaps superior dextrin is more suitable as a component of the base material. Other suitable dextrins for use in the present invention include: Fibersol®-2, manufactured by Matsutani America, Inc./ADM; Sunfiber®, manufactured by Taiyo Kagaku Co., Ltd./NutriScience USA; Oliggo-Fiber® Instant Inulin and Oliggo-Fiber® F97, both manufactured by Cargill Health and Food Technologies; and, Fortefiber™, manufactured by Dow Chemical Company. Other dextrins similar to the aforementioned proprietary dextrins that have similar structures and properties may also be suitable as a component of the base material.

Fibersol®-2, Sunfiber®, Oliggo-Fiber® Instant Insulin, Oliggo-Fiber® F97, and Fortefiber™ are a proprietary materials, and it is believed that only the manufacturer knows the exact contents thereof, thereby necessitating the use of the trademark herein.

A preferred dextrin of the present invention is one with typical properties that include: high to total solubility in water or water-based emulsions; low to very low viscosity; good to excellent pH stability; excellent heat stability; and, a high content of water soluble dietary fiber. In a preferred embodiment of the present invention, the dextrin has a water-soluble dietary fiber content of between about 20% to about 100%, in a more preferred embodiment between about 60% to about 100%, and in an even more preferred embodiment between about 80% to about 100%. In a preferred embodiment of the present invention, the dextrin has a cold water soluble percent by weight value at room temperature of between about 20% to about 100%, in a more preferred embodiment between about 50% to about 100%, and in an even more preferred embodiment between about 80% to about 100%. In a preferred embodiment of the present invention, the dextrin has a pH of between about 2 to about 12, in a more preferred embodiment between about 4 to about 10, and in an even more preferred embodiment between about 5 to about 8.

In one embodiment of the present invention, the dextrin is maltodextrin. Maltodextrin, having the CAS No. 9050-36-6, has typical properties that include: white powder appearance; a pH of between about 4.0 and about 6.0; and, a solubility of greater than or equal to 98%.

The blend vehicle of the present invention comprises an emulsion. An emulsion is known by those of ordinary skill in the art to be a stable mixture of two or more immiscible liquids held in suspension by a small percentage of substances called emulsifiers. In the present invention, the emulsion comprises water and non-volatile solids, where non-volatile solids are being emulsed by the emulsifying agent. The non-volatile solids of the present invention are resins, as well as the emulsifying agent. As used herein, emulsions include colloidal dispersions.

A preferred blend vehicle of the present invention is an acrylic polymer emulsion, although others may be suitable emulsions. Emulsions that may be blend vehicles of the present invention include but are not limited to aqueous emulsions such as acrylic emulsions, acrylic copolymer emulsions, acrylic hydroxyl functional emulsions, acrylic self cross-linking emulsions, acrylic urethane emulsions, ethylene acrylic acid emulsions, ethylene vinyl acid emulsions, ethylene vinyl chloride emulsions, styrene acrylic emulsions, and styrene butadiene emulsions. Additionally, other aqueous emulsions such as urethane emulsions may be blend vehicles of the present invention, including but not necessarily limited to aliphatic cross-linking emulsions, aliphatic polyester emulsions, aromatic polyester emulsions, and urethane acrylic emulsions. Additional aqueous emulsions suitable as blend vehicles include but are not limited to vinyl acrylic emulsions, vinyl acetate emulsions, vinyl acetate ethylene emulsions, vinyl butadiene emulsions, vinyl chloride acrylic emulsions, and vinylidene chrloride emulsions.

In a preferred embodiment of the present invention, the blend vehicle is an acrylic polymer emulsion. The polymer portion of an acrylic emulsion is produced by reacting blends of acrylic ester monomers, which were produced via the esterification reaction of acrylic acid or methacrylic acid in an alcohol. The average degree of polymerization, which can be measured in average chain length or approximated via average molecular weight, varies from one acrylic polymer to another and from one application to another. The degree of polymerization is proprietary to the manufacturers of most acrylic polymer emulsions, including many that are suitable as components of the present invention.

In an embodiment the present invention, the blend vehicle is an acrylic polymer emulsion with typical properties that include: a percentage of non-volatile solids (NVS) of about 25% to about 65%; a viscosity of about 10 centipoise (CPS) to about 4000 CPS; a glass transition temperature (Tg) of about −60° C. to about 120° C.; an acid number of 0 to about 300; and, a pH of about 2.5 to about 10.0. An acrylic polymer emulsion with one or more typical properties outside of the aforementioned ranges may still be an appropriate blend vehicle for the present invention.

In a preferred embodiment the present invention, the blend vehicle is an acrylic polymer emulsion with typical properties that include: a NVS of about 25% to about 55%; a viscosity of about 10 CPS to about 2500 CPS; a Tg of about −50° C. to about 100° C.; an acid number of 0 to about 150; and, a pH of about 6.0 to about 10.0.

In a more preferred embodiment the present invention, the blend vehicle is an acrylic polymer emulsion with typical properties that include: a NVS of about 30% to about 55%; a viscosity of about 10 CPS to about 1500 CPS; a Tg of about −40° C. to about 100° C.; an acid number of 0 to about 115; and, a pH of about 7.0 to about 9.0.

A preferred blend vehicle of the present invention is the acrylic polymer emulsion Sequabond® VS9010, although other similar acrylic polymer emulsions with similar typical properties could be substituted for Sequabond® VS9010. Sequabond® VS9010 is a proprietary material, and it is believed that only the manufacturer knows the exact contents thereof, thereby necessitating the use of a trademark herein. Typical properties of Sequabond® VS9010 include: an acid number of about 33; a molecular weight of between about 300,000 to about 700,000; a weight per gallon of about 8.7 pounds; a pH of about 8.3; a translucent appearance; a Tg of about −30° C.; a NVS of about 47.0%; and, a viscosity of about 600 CPS.

Another preferred blend vehicle of the present invention is Joncryl® LMV7031, although other similar acrylic polymer emulsions with similar typical properties could be substituted for Joncryl® LMV7031. Joncryl® V LMV7031 is a proprietary material, and it is believed that only the manufacturer knows the exact contents thereof, thereby necessitating the use of a trademark herein. Typical properties of Joncryl® LMV7031 include: a translucent appearance; a pH of about 7.5; a NVS of about 47.5%; a viscosity of about 1500 CPS; a Tg of about −9° C.; a molecular weight in excess of 200,000; an acid number of about 57; and, a weight per gallon of about 8.7 pounds.

In an embodiment of the present invention, the blend vehicle comprises a hybrid blend vehicle, where the hybrid blend vehicle is a mixture of two or more emulsions.

In one embodiment of the present invention, the base material further comprises a defoaming agent (also referred to herein as a defoamer). It is understood by those of ordinary skill in the art that a defoamer in a water-based printing ink aids in preventing the foaming of the printing ink under the adverse conditions of high temperature and shearing force encountered in flexographic and rotogravure printing processes, as well as in the base material and printing ink manufacturing processes. A preferred defoamer for use in the present invention is Tego® Foamex 842. Tego® Foamex 842 is a proprietary material, and it is believed that only the manufacturer knows the exact contents thereof, thereby necessitating the use of a trademark herein. Tego® Foamex 842 is a silica-free solution of polyether siloxane copolymer, and has the appearance of a clear liquid, has an active matter content of approximately 60%, and the solvent is dipropylene glycol monomethylene. Other acceptable defoamers include, but are not limited to, siloxane-based or mineral oil-based defoamers, or defoamers similar to Tego® Foamex 842. Additional acceptable defoamers may be solvents, such as glycol ethers and alcohols. Although Tego® Foamex 842 is currently a preferred defoamer, it is possible that, with additional testing, another alternative or perhaps superior defoamer is suitable as a component of the base material. Other similar defoamers and defoamers known by those of ordinary skill in the art to be suitable for use in the present invention are properly, equitably, and intended to be, within the full range of equivalents of the invention disclosed and described herein.

In one embodiment of the present invention, the base material further comprises a drying retarder. It is understood by those of ordinary skill in the art that a drying retarder in a water-based printing ink is typically a high boiling point solvent that aids in slowing the evaporation rate of the printing ink or printing ink base material. Ideally, a drying retarder will additionally aid in lubricity of the printing ink. A preferred drying retarder for use in the present invention is propylene glycol. Other acceptable drying retarders include, but are not limited to, glycol ethers or glycerin, or other compounds with similar boiling points and flash points as propylene glycol. Although propylene glycol is currently a preferred drying retarder, it is possible that, with additional testing, another alternative or perhaps superior drying retarder is suitable as a component of the base material. Other similar drying retarders and drying retarders known by those of ordinary skill in the art to be suitable for use in the present invention are properly, equitably, and intended to be, within the full range of equivalents of the invention disclosed and described herein.

In one embodiment of the present invention, the base material further comprises a coalescing agent. It is understood by those of ordinary skill in the art that a coalescing agent in a water-based printing ink aids in the film formation of the blend vehicle, aids in the adhesion of the printing ink made from the base material to the printing substrate, and aids in the de-aeration of the printing ink made from the base material. A preferred coalescing agent for use in the present invention is glycol ether. Glycol ethers may aid in lowering the surface tension of a printing ink made from the base material of the present invention. Although glycol ether is currently a preferred coalescing agent, it is possible that, with additional testing, another alternative or perhaps superior coalescing agent is suitable as a component of the base material. Other similar coalescing agents and coalescing agents known by those of ordinary skill in the art to be suitable for use in the present invention are properly, equitably, and intended to be, within the full range of equivalents of the invention disclosed and described herein.

In one embodiment of the present invention, the base material further comprises a dispersant. It is understood by those of ordinary skill in the art that a dispersant in a water-based printing ink aids in the uniform and maximum dispersal of solid materials throughout the ink base material, including the dispersal of pigments or inert materials subsequently added to the base material. A dispersant prevents the re-agglomeration of inert materials in the printing ink base material, as well as in a printing ink that is subsequently made from the base material of the present invention. A dispersant may additionally permit the manufacture of the base material without the addition of water, although water may be necessary in the subsequent manufacture of the printing ink, once a pigment is added to the base material. A preferred dispersant for use in the present invention is Solsperse® 27000. Solsperse® 27000 is a proprietary material, and it is believed that only the manufacturer knows the exact contents thereof, thereby necessitating the use of a trademark herein. Generally, however, Solsperse® 27000 is a polyether. Typical properties of Solsperse® 27000 include: a dark amber liquid appearance; a boiling point (BP) of greater than 100° C.; a flash point of greater than 325° C.; and, a weight per gallon of about 9.43 pounds. Although Solsperse® 27000 is currently a preferred dispersant, it is possible that, with additional testing, another alternative or perhaps superior dispersant is suitable as a component of the base material. Other similar dispersants and dispersants known by those of ordinary skill in the art to be suitable for use in the present invention are properly, equitably, and intended to be, within the full range of equivalents of the invention disclosed and described herein.

In one embodiment of the present invention, the base material further comprises water or deionized water. Deionized water lacks metal ions and other contaminants that may be found in tap water that might interfere with the components of the printing ink base material, or with the components of a printing ink made from the base material of the present invention. The base material of the present invention does not require, when water is present in the base material, that the water be deionized water, however deionized water is preferred over tap water. It is understood by those or ordinary skill in the art that water aids in the thinning of a base material that might have thickened during manufacture, as well as potentially affecting viscosity, pH, or both, of the base material. It is further understood by those of ordinary skill in the art that additional water may be added to the printing ink after the addition of any pigments or dyes to the base material to adjust the printing ink in some manner, and that such volumes of water, if any, are not accounted for herein, and are not taken into consideration when determining the amount of water, by weight, of the invention disclosed herein.

In one embodiment of the present invention, where the printing ink base material consists essentially of a blend vehicle, a dextrin, a drying retarder, a defoamer, and a coalescing agent, the respective elements of the printing ink material are of the following range of percentages by weight of the printing ink material:
Blend vehicle=about 30% to about 99%
Dextrin=greater than 0% to about 40%
Drying retarder=greater than 0% to about 10%
Defoamer=greater than 0% to about 10%
Coalescing agent=greater than 0% to about 10%

In a preferred embodiment of the present invention, where the printing ink base material consists essentially of a blend vehicle, a dextrin, a drying retarder, a defoamer, and a coalescing agent, the respective elements of the printing ink material are of the following range of percentages by weight of the printing ink material:
Blend vehicle=about 55% to about 90%
Dextrin=about 10% to about 30%
Drying retarder=greater than 0% to about 5%
Defoamer=greater than 0% to about 5%
Coalescing agent=greater than 0% to about 5%

In a more preferred embodiment of the present invention, where the printing ink base material consists essentially of a blend vehicle, a dextrin, a drying retarder, a defoamer, and a coalescing agent, the respective elements of the printing ink material are of the following range of percentages by weight of the printing ink material:
Blend vehicle=about 80% to about 85%
Dextrin=about 10% to about 15%
Drying retarder=about 1% to about 3%
Defoamer=about 1% to about 3%
Coalescing agent=about 1% to about 3%

In one embodiment of the present invention, where the printing ink base material consists essentially of a blend vehicle, a dextrin, a drying retarder, a defoamer, a coalescing agent, and deionized water, the respective elements of the printing ink material are of the following range of percentages by weight of the printing ink material:
Blend vehicle=about 10% to about 99%
Dextrin=greater than 0% to about 40%
Drying retarder=greater than 0% to about 10%
Defoamer=greater than 0% to about 10%
Coalescing agent=greater than 0% to about 10%
Deionized water=greater than 0% to about 30%

In a preferred embodiment of the present invention, where the printing ink base material consists essentially of a blend vehicle, a dextrin, a drying retarder, a defoamer, a coalescing agent, and deionized water, the respective elements of the printing ink material are of the following range of percentages by weight of the printing ink material:
Blend vehicle=about 35% to about 90%
Dextrin=about 8% to about 30%
Drying retarder=greater than 0% to about 5%
Defoamer=greater than 0% to about 5%
Coalescing agent=greater than 0% to about 8%
Deionized water=greater than 0% to about 20%

In a more preferred embodiment of the present invention, where the printing ink base material consists essentially of a blend vehicle, a dextrin, a drying retarder, a defoamer, a coalescing agent, and deionized water, the respective elements of the printing ink material are of the following range of percentages by weight of the printing ink material:
Blend vehicle=about 55% to about 85%
Dextrin=about 2% to about 15%
Drying retarder=greater than 0% to about 5%
Defoamer=greater than 0% to about 5%
Coalescing agent=greater than 0% to about 5%
Deionized water=greater than 0% to about 15%

In one embodiment of the present invention, where the printing ink base material consists essentially of a blend vehicle, a dextrin, a drying retarder, a defoamer, a coalescing agent, and a dispersant, the respective elements of the printing ink material are of the following range of percentages by weight of the printing ink material:
Blend vehicle=about 15% to about 99%
Dextrin=greater than 0% to about 40%
Drying retarder=greater than 0% to about 10%
Defoamer=greater than 0% to about 10%
Coalescing agent=greater than 0% to about 10%
Dispersant=greater than 0% to about 15%

In a preferred embodiment of the present invention, where the printing ink base material consists essentially of a blend vehicle, a dextrin, a drying retarder, a defoamer, a coalescing agent, and a dispersant, the respective elements of the printing ink material are of the following range of percentages by weight of the printing ink material:
Blend vehicle=about 35% to about 90%
Dextrin=greater than 0% to about 30%
Drying retarder=greater than 0% to about 8%
Defoamer=greater than 0% to about 8%
Coalescing agent=greater than 0% to about 8%
Dispersant=about 1% to about 12%

In a more preferred embodiment of the present invention, where the printing ink base material consists essentially of a blend vehicle, a dextrin, a drying retarder, a defoamer, a coalescing agent, and a dispersant, the respective elements of the printing ink material are of the following range of percentages by weight of the printing ink material:
- Blend vehicle=about 70% to about 90%
- Dextrin=about 1% to about 10%
- Drying retarder=greater than 0% to about 5%
- Defoamer=greater than 0% to about 5%
- Coalescing agent=greater than 0% to about 5%
- Dispersant=about 1% to about 8%

In one embodiment of the present invention, where the printing ink base material consists essentially of a blend vehicle, a dextrin, a drying retarder, a defoamer, a coalescing agent, a dispersant, and deionized water, the respective elements of the printing ink material are of the following range of percentages by weight of the printing ink material:
- Blend vehicle=about 10% to about 99%
- Dextrin=greater than 0% to about 40%
- Drying retarder=greater than 0% to about 10%
- Defoamer=greater than 0% to about 10%
- Coalescing agent=greater than 0% to about 10%
- Dispersant=greater than 0% to about 12%
- Deionized water=greater than 0% to about 35%

In a preferred embodiment of the present invention, where the printing ink base material consists essentially of a blend vehicle, a dextrin, a drying retarder, a defoamer, a coalescing agent, a dispersant, and deionized water, the respective elements of the printing ink material are of the following range of percentages by weight of the printing ink material:
- Blend vehicle=about 20% to about 90%
- Dextrin=greater than 0% to about 30%
- Drying retarder=greater than 0% to about 8%
- Defoamer=greater than 0% to about 8%
- Coalescing agent=greater than 0% to about 8%
- Dispersant=greater than 0% to about 10%
- Deionized water=greater than 0% to about 25%

In a more preferred embodiment of the present invention, where the printing ink base material consists essentially of a blend vehicle, a dextrin, a drying retarder, a defoamer, a coalescing agent, a dispersant, and deionized water, the respective elements of the printing ink material are of the following range of percentages by weight of the printing ink material:
- Blend vehicle=about 70% to about 90%
- Dextrin=about 1% to about 15%
- Drying retarder=about 1% to about 5%
- Defoamer=about 1% to about 5%
- Coalescing agent=about 1% to about 5%
- Dispersant=about 1% to about 8%
- Deionized water=greater than 0% to about 15%

The present invention additionally comprises a method for manufacturing the printing ink base material disclosed herein.

In one embodiment of the method of the present invention, the method comprises the steps of: blending a blend vehicle, a drying retarder, a defoamer, and a coalescing agent; adding a dextrin gradually while blending continues; introducing heat slowly upon the addition of a dextrin while blending continues; and, optionally, adding water or deionized water while blending continues to complete the base material. Agitation with mechanical mixing, preferably in concert with a blade that imparts shear, is appropriate for use in this method. It is understood by those of ordinary skill in the art that a shearing-type blending blade is particularly appropriate for use in this method. It may be desirable to add pigment to the base material, and it may additionally be desirable to adjust for pH and viscosity after the addition of the pigment, through methods known by those of ordinary skill in the art, in order to create a printing ink from the base material.

In a preferred embodiment of the method of the present invention, the method comprises the steps of: blending a blend vehicle, a drying retarder, a defoamer, a coalescing agent, a dextrin, and a dispersant, at room temperature; and, optionally, adding water or deionized water while blending continues to complete the base material. Agitation with mechanical mixing, preferably in concert with a blade that imparts shear, is appropriate for use in this method. It is understood by those of ordinary skill in the art that a shearing-type blending blade is particularly appropriate for use in this method. It may be desirable to add pigment to the base material, and it may additionally be desirable to adjust for pH and viscosity after the addition of the pigment, through methods known by those of ordinary skill in the art, in order to create a printing ink from the base material.

The presence of a dispersant in the method of the present invention is preferable to the absence of a dispersant, among other reasons, because the dispersant permits a higher percentage by weight of pigment to be added to the printing ink base material than if the dispersant was not present. This is beneficial in that an increase in pigment can increase the intensity of the color of the printed material that is the ultimate result of the printing ink base material of the present invention. The dispersant prevents the re-agglomeration of inert materials in the printing ink base material, as well as in a printing ink that is subsequently made from the base material of the present invention.

From the foregoing description, one of ordinary skill in the art can easily ascertain that the present invention provides a novel printing ink base material, as well as a method for manufacturing the same, which provides certain beneficial results that have been more fully enumerated herein.

Highly important technical advantages of the present invention include, but are not limited to, a printing ink base material that is a precursor to printing inks that: have an increased viscosity and printability over others previously known in the art; have an increased the graphic fidelity over others previously known in the art; have improved rheology and less resistance to flow over others previously known in the art; and, may be used with an anilox roll of a high line screen.

The present invention is an improvement over the state of the art by providing a base material that can take pigments, including those with moderate to high surface areas, micron particle sizes and specific gravities, and still produce high definition, high intensity, high quality printed materials when printed with an anilox roll of a high line screen.

Without departing from the spirit and scope of this invention, one of ordinary skill in the art can make various changes and modifications to the invention to adapt it to various usages and conditions, including those not specifically laid out herein. As such, those changes and modifications are properly, equitably, and intended to be, within the full range of equivalents of the invention disclosed, described and claimed herein.

I claim:

1. A printing ink base material comprising dextrin and a blend vehicle, where each dextrin is a water-soluble dextrin comprising a water-soluble dietary fiber, where the average molecular weight of each dextrin is 10,000 or less, and where the blend vehicle is a water-based emulsion.

2. The printing ink base material of claim 1, where the blend vehicle is an acrylic polymer emulsion.

3. The printing ink base material of claim 2, wherein the dextrin is selected from the group consisting of cyclodextrin, maltodextrin, Fibersol 2, and a dextrin defined generally by the structure:

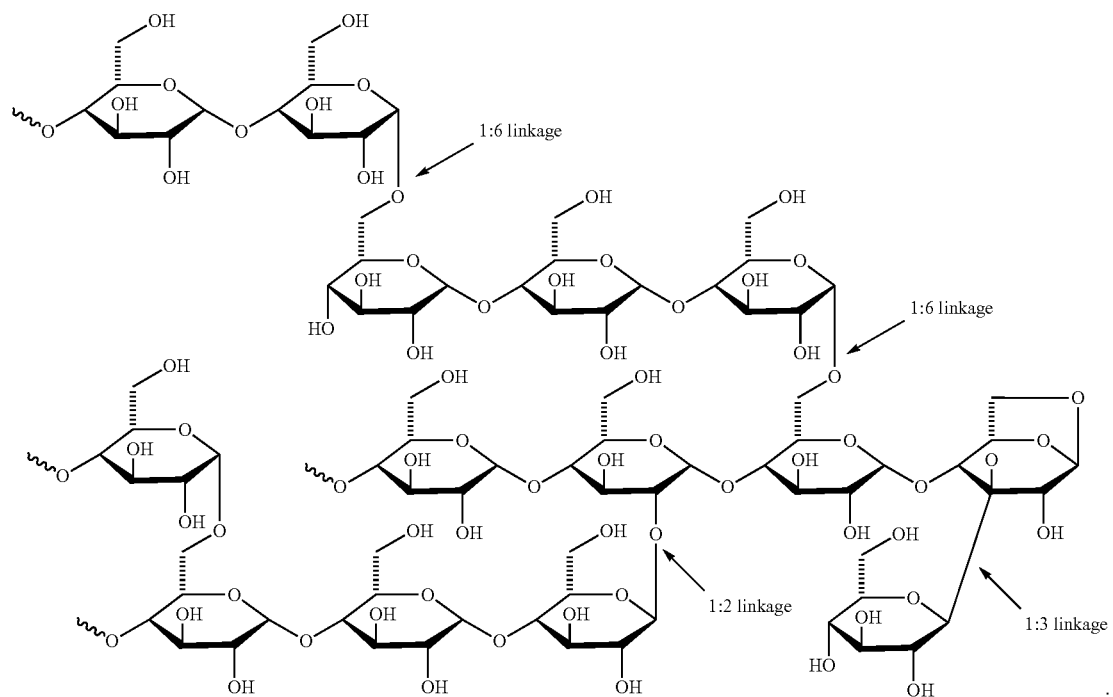

4. The printing ink base material of claim 3, where the dextrin is maltodextrin.

5. The printing ink base material of claim 2, wherein the dextrin is present in an amount between greater than 0% and 40% by weight of the printing ink base material.

6. The printing ink base material of claim 5, wherein the acrylic polymer emulsion is present in an amount between 10% and 99% by weight of the printing ink base material.

7. The printing ink base material of claim 5, further comprising a drying retarder, a defoamer, and a coalescing agent.

8. The printing ink base material of claim 7, further comprising a dispersant.

9. The printing ink base material of claim 1, wherein the dextrin is selected from the group consisting of cyclodextrin, maltodextrin, Fibersol 2, and a dextrin defined generally by the structure:

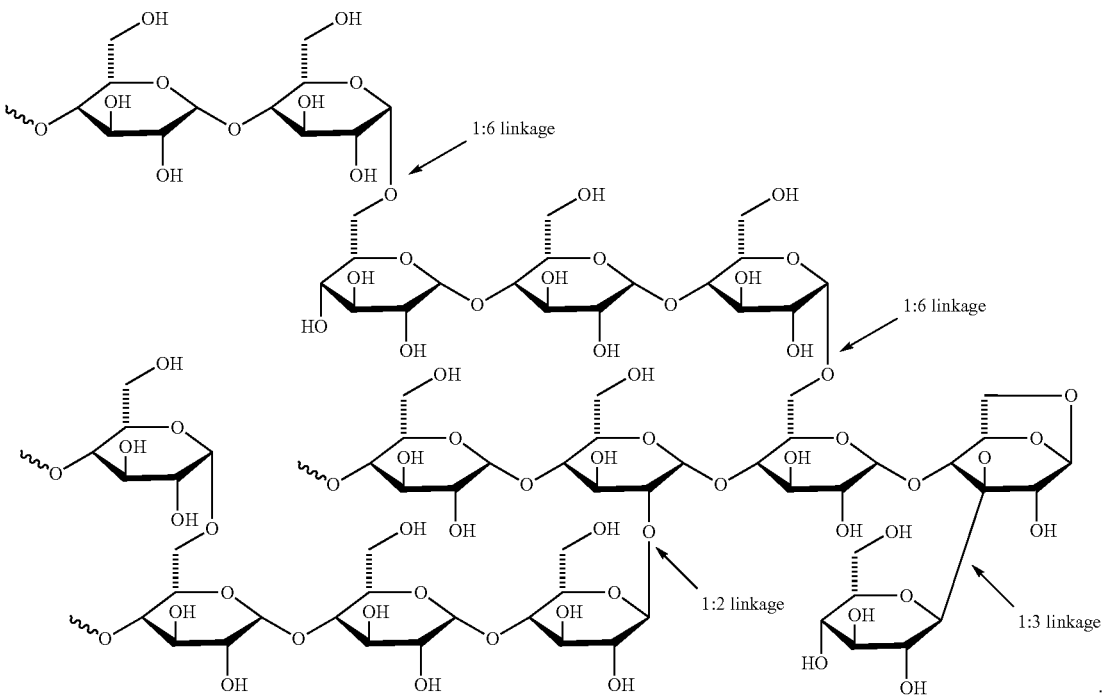

10. The printing ink base material of claim 9, where the dextrin is maltodextrin.

11. The printing ink base material of claim 1, wherein the blend vehicle is an acrylic nolvmer emulsion present in an amount between 10% and 99% by weight of the printing ink base material.

12. The printing ink base material of claim 11, further comprising a drying retarder, a defoamer, and a coalescing agent.

13. The printing ink base material of claim 12, further comprising a dispersant.

14. The printing ink base material of claim 1, further comprising a drying retarder, a defoamer, and a coalescing agent.

15. The printing ink base material of claim 14, further comprising a dispersant.

16. A printing ink base material comprising dextrin and a blend vehicle, where each dextrin is a water-soluble dextrin having an average molecular weight of 10,000 or less, and having a water-soluble dietary fiber content of between about 20% to about 100%, and having a pH of between about 2 to about 12, and where the blend vehicle is a water-based acrylic emulsion having an acid number of about 33, a molecular weight of between about 300,000 to about 700,000, a weight per gallon of about 8.7 pounds, a pH of about 8.3, a Tg of about −30 ° C., a NVS of about 47.0%, and a viscosity of about 600 CPS.

17. The printing ink base material of claim 16, where the dextrin is defined generally by the structure:

18. The printing ink base material of claim 17, further comprising a drying retarder, a defoamer, and a coalescing agent.

19. The printing ink base material of claim 18, further comprising a dispersant.

20. A printing ink base material comprising dextrin and a blend vehicle, where each dextrin is a water-soluble dextrin having an average molecular weight of vehicle is a water-based acrylic emulsion having a pH of about 7.5, a NVS of about 47.5%, a viscosity of about 1500 CPS, a Tg of about −9 ° C., a molecular weight in excess of 200,000, an acid number of about 57, and a weight per gallon of about 8.7 pounds.

21. The printing ink base material of claim 20, where the dextrin is defined generally by the structure:

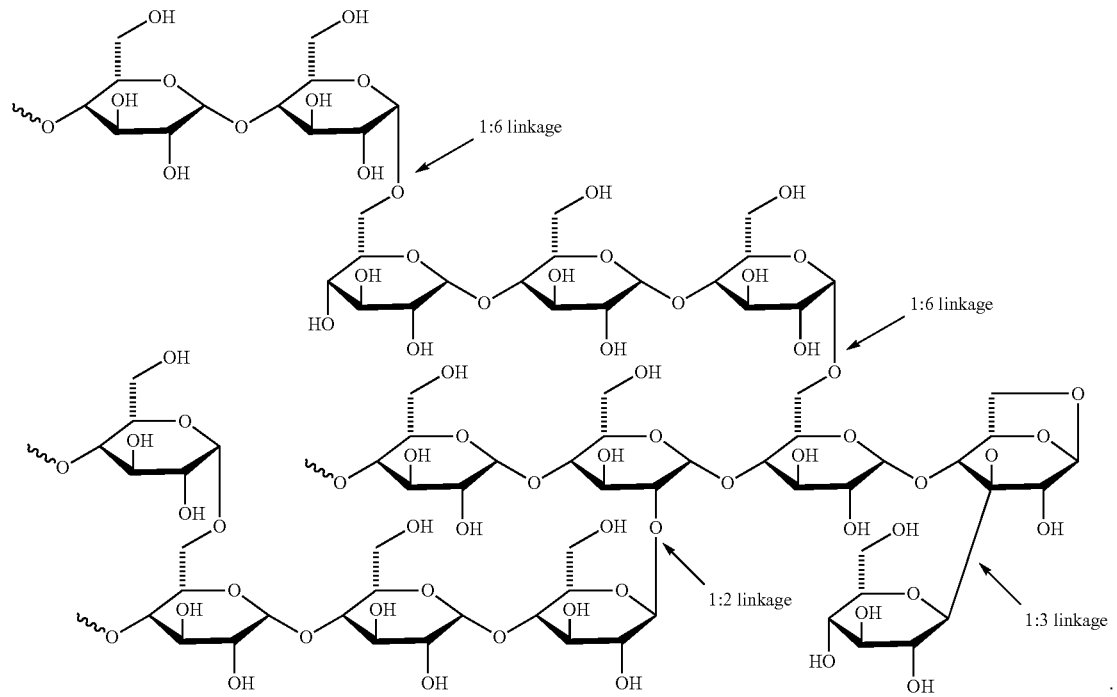

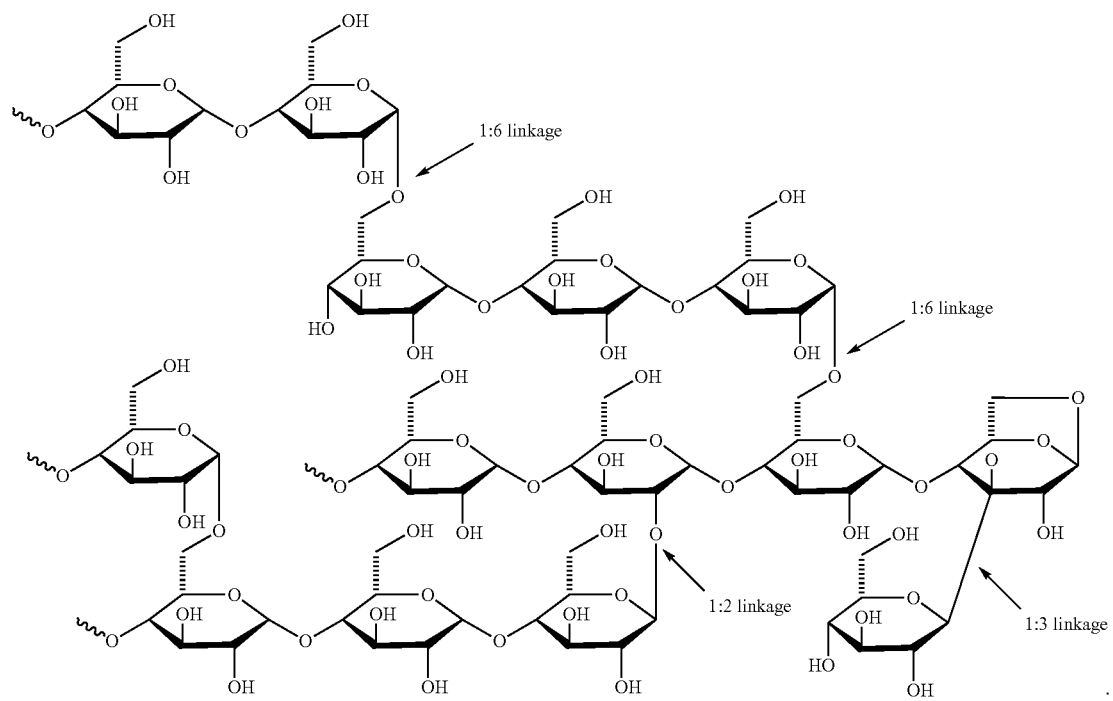
22. The printing ink base material of claim 21, further comprising a drying retarder, a defoamer, and a coalescing agent.
23. The printing ink base material of claim 22, further comprising a dispersant.
* * * * *